United States Patent
Mair et al.

(10) Patent No.: US 9,701,313 B2
(45) Date of Patent: Jul. 11, 2017

(54) METHOD FOR REGULATING A DRIVE TRAIN OF A MOTOR VEHICLE

(71) Applicant: ZF Friedrichshafen AG, Friedrichshafen (DE)

(72) Inventors: Roland Mair, Tettnang (DE); Kai Leingruber, Ravensburg (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 14/878,090

(22) Filed: Oct. 8, 2015

(65) Prior Publication Data

US 2016/0107651 A1    Apr. 21, 2016

(30) Foreign Application Priority Data

Oct. 20, 2014    (DE) .................. 10 2014 221 251

(51) Int. Cl.
*B60W 10/02* (2006.01)
*B60W 10/06* (2006.01)
(Continued)

(52) U.S. Cl.
CPC ...... *B60W 30/18118* (2013.01); *B60W 10/02* (2013.01); *B60W 10/06* (2013.01);
(Continued)

(58) Field of Classification Search
None
See application file for complete search history.

(56) References Cited

U.S. PATENT DOCUMENTS 4,804,074 A    2/1989    Kori
5,769,752 A    6/1998    Kim
(Continued)

FOREIGN PATENT DOCUMENTS

DE         196 53 203 A1    7/1997
DE    10 2009 000 532 A1    8/2010
(Continued)

OTHER PUBLICATIONS

German Search Report corresponding to DE 10 2014 221 251.0 dated Aug. 24, 2015.

*Primary Examiner* — Edwin A Young
(74) *Attorney, Agent, or Firm* — Davis & Bujold, PLLC; Michael J. Bujold

(57) ABSTRACT

A method of regulating a vehicle drive-train in which actuation of an automatic starting element is regulated when starting the vehicle, and, during this regulation, monitoring a predetermined travel direction, reception of a brake release command and reception of a drive command. Furthermore, after receipt of the release command, the vehicle is held stationary, by a holding operation of the vehicle, until the drive command is received. If movement of the vehicle in a direction opposite to the predetermined travel direction is detected, actuation of the starting element is increased to a firmer engagement level. Once the driver releases the brake and until the drive command is received, if further movement of the vehicle, in the predetermined travel direction, is detected, then actuation of the starting element is decreased toward a lesser engagement level.

11 Claims, 1 Drawing Sheet

(51) Int. Cl.
*B60W 10/184* (2012.01)
*B60W 30/18* (2012.01)
*B60W 50/00* (2006.01)

(52) U.S. Cl.
CPC .... *B60W 10/184* (2013.01); *B60W 30/18027* (2013.01); *B60W 2050/0049* (2013.01); *B60W 2520/06* (2013.01); *B60W 2540/10* (2013.01); *B60W 2540/12* (2013.01); *B60W 2550/142* (2013.01); *B60W 2710/022* (2013.01); *B60W 2710/023* (2013.01)

(56) References Cited

U.S. PATENT DOCUMENTS

| | | | | |
|---|---|---|---|---|
| 6,748,311 | B1* | 6/2004 | Walenty | B60W 10/02 701/70 |
| 8,090,499 | B2* | 1/2012 | Tamai | B60W 10/06 477/3 |
| 2009/0258754 | A1* | 10/2009 | Uddin | B60W 10/02 477/92 |
| 2010/0198470 | A1 | 8/2010 | Weck et al. | |
| 2011/0259679 | A1* | 10/2011 | Mair | B60T 7/122 188/110 |

FOREIGN PATENT DOCUMENTS

| | | |
|---|---|---|
| DE | 10 2011 105 505 A1 | 1/2012 |
| EP | 1 630 054 A1 | 3/2006 |

\* cited by examiner

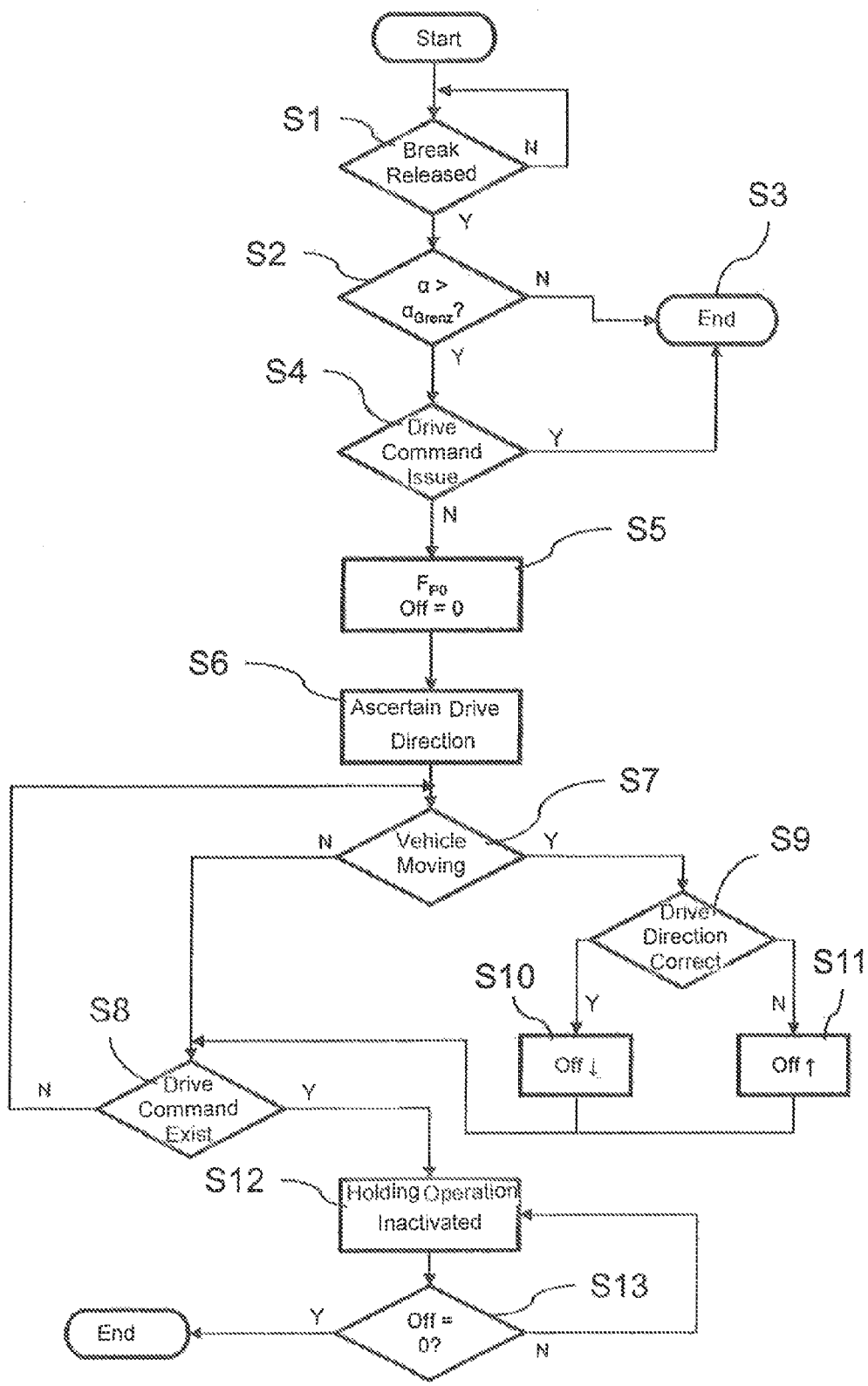

METHOD FOR REGULATING A DRIVE TRAIN OF A MOTOR VEHICLE

This application claims priority from German patent application serial no. 10 2014 221 251.0 filed Oct. 20, 2014.

FIELD OF THE INVENTION

The invention concerns a method for regulating a drivetrain of a motor vehicle, wherein actuation of an automatic or automated starting element during a starting process of the motor vehicle is regulated and during this a predetermined driving direction, the reception of a brake release command and the reception of a drive command issued by a driver of the vehicle are monitored, and wherein, when the release command has been received and until the drive command is also received, the motor vehicle is held during the course of a holding operation essentially in a current position, in that if movement of the motor vehicle in a direction contrary to the predetermined travel direction is detected, the actuation of the starting element is corrected toward a greater closing level.

BACKGROUND OF THE INVENTION

In motor vehicles with automatic or automated starting elements, starting processes produce drive situations in which, if the drive-train concerned is unsuitably regulated, uncomfortable conditions in the form of undesired rolling of the vehicle can occur. Whereas in drive-trains with hydrodynamic torque converters as the starting element, by virtue of their mode of operation, after a brake has been released crawling of the motor vehicle in the travel direction predetermined in each case takes place automatically, with starting elements in the form of separator clutches this can only happen by virtue of appropriate regulation of the separator clutch concerned. Thus, in drive-trains having automatic or automated separator clutches, assistance functions are often implemented, by means of which a hill start is facilitated for the vehicle driver in that, by virtue of the function, when actuation of a brake pedal has ended and until sufficient torque has been built up, an undesired rolling of the motor vehicle is prevented.

In most cases, when the motor vehicle concerned comes to rest, the braking pressure in the brake system is maintained and not reduced when the vehicle's driver reduces the actuation of the brake pedal. Usually, the braking pressure is only reduced when it is recognized, or it can be assumed that the motor vehicle can be held by a sufficient drive torque, or after a specified waiting time has elapsed. With regards to sufficient drive torque, either a corresponding measurement of the torque or an interrogation is made by one of the control units, such as the transmission control unit, or it is assumed that in the drive-train, after the passage of a certain time-period after the end of the brake actuation, a sufficient torque will be available. Sometimes, however, undesired rolling of the motor vehicle in the direction contrary to the predetermined travel direction is prevented by appropriate regulation of the starting element.

For example, EP 1 630 054 A1 describes a method for regulating a drive-train of a motor vehicle, in which by appropriate actuation of a starting element the motor vehicle concerned is electronically prevented from rolling. In the context of that method, as the specifications by a driver of the vehicle a predetermined travel direction, the reception of a command to release a brake of the motor vehicle, and the reception of a drive command are monitored. If then a starting situation of the motor vehicle is recognized, i.e. the brake release command has been given, but no drive command from the vehicle's driver has yet been received, then by virtue of a holding operation the motor vehicle is prevented from rolling in a direction contrary to the predetermined travel direction, in that if movement contrary to the predetermined travel direction is detected, then from the acceleration and the weight of the vehicle a necessary holding torque is calculated and the corresponding torque is called for from a drive engine of the motor vehicle. Furthermore, actuation of the starting element is corrected in such manner that the holding torque can be transmitted. Consequently, undesired rolling of the motor vehicle contrary to the predetermined travel direction is prevented.

SUMMARY OF THE INVENTION

Starting from the prior art described above, the purpose of the present invention is now to provide a method for regulating a drive-train of a motor vehicle, such that with the help of the method, when the driver of the vehicle has released the brake and until a drive command has been received, the motor vehicle will remain in its current position.

This objective is achieved with the characterizing features and advantageous further developments of the invention as described below. A motor vehicle drive-train regulated in accordance with a method according to the invention is also described below. In addition a computer program and a data carrier containing it are also objects of the invention described below.

According to the invention, in a, method for regulating a drive-train of a motor vehicle, an automatic or automated starting element is actuated in a controlled manner during the starting of the motor vehicle, and during this, demands from the driver of the vehicle in the form of a predetermined travel direction, the reception of a command to release a brake of the motor vehicle and the reception of a drive command, are monitored. Once the release command has been given and until the drive command is received, while in a holding operation mode the motor vehicle is held essentially in a current position, in that if movement of the motor vehicle in a direction contrary to the predetermined direction is detected, actuation of the starting element is corrected toward a higher closing level.

The starting element is in particular a fully automatically actuated or automated separator clutch which, specifically, can be a dry-operating or wet-running friction clutch. Depending on the design of a motor vehicle transmission located downstream from the starting element, this can be a dual-clutch or even a single-clutch.

The predetermined driving direction, i.e. the direction in which the vehicle's driver wants the motor vehicle to move at the conclusion of the starting process, is determined in particular in that the gear selected or a selected mode in a motor vehicle transmission is ascertained. If a forward gear has been engaged or, in an automatic transmission or an automated shift transmission, a forward driving operation mode has been selected, it can be concluded that the driver wishes the motor vehicle to move forward. On the other hand, if a reverse gear has been engaged or, in an automatic transmission or an automated shift transmission, a reverse driving operation mode has been selected, it can be concluded that the driver wishes the motor vehicle to move in reverse.

Furthermore, the "release command" of the brake is Monitored by detecting the position of a brake pedal, whereby a release command is recognized as having been given if the brake pedal has been fully released by the driver or if actuation of the brake pedal has been reduced to a level which can be interpreted as the vehicle driver's wish to release the brake. If necessary, for this purpose the position of an accelerator pedal can also be monitored, and then the release command is deduced if, in addition, the accelerator pedal is actuated by an amount that builds up a torque in the drive-train that corresponds to a required holding torque.

In a similar manner the "drive command" is preferably monitored with reference to the position of an accelerator pedal, such that the command is deemed to have been issued when the accelerator pedal has been actuated to the maximum extent or at least to a marked extent, i.e. when a specified target torque defined by the accelerator pedal clearly exceeds the holding torque required for holding the vehicle in its current position. Correspondingly, no drive command exists if the accelerator pedal has not been actuated or is actuated only so much that the target torque does not lastingly exceed the required holding torque.

In the context of the invention the expression "essentially" means that deviations only occur in the form of changes that are insignificant for the function concerned. This means, in particular, very slight movements of the motor vehicle.

The invention now embraces the technical principle that during a holding operation, and furthermore if a movement of the motor vehicle in the predetermined travel direction is detected, actuation of the starting element is corrected in the direction toward a lower closing level. In other words, i.e. during a holding operation, the actuation of the starting element is also corrected if it is recognized that the motor vehicle has moved away from its current position at the time, in the predetermined travel direction, but without this being desired. Thus, a core aspect of the invention is that during a holding operation any departure from the current position is monitored, and if movement is detected, this movement is opposed by closing the starting element more firmly or by opening the starting element. Thus, if contrary rolling is detected, i.e. rolling backward when driving forward is desired or rolling forward when driving in reverse is desired, this is counteracted by increasing the torque transmitted by the starting element, namely by closing the starting element farther. In the opposite case, if forward crawling of the vehicle is detected, i.e. it is moving forward when forward driving is desired or backward when reverse driving is desired, then that movement is counteracted by reducing the closure level of the starting element and thereby decreasing the torque transmitted.

By virtue of the method according to the invention it is thus possible, at least to a large extent, to hold the motor vehicle concerned in its current position until the presence of a concrete drive command from the vehicle's driver has been recognized, such that during this even forward crawling is suppressed without the driver having to increase the brake actuation level again. In this case actuation of the starting element during a starting process is only corrected if undesired movement away from the current position is detected. In contrast, if the currently chosen actuation level of the starting element suffices to hold the vehicle in its current position, then no correction is applied to the actuation of the starting element.

In contrast, in the case of the method according to EP 1 630 054 A1 actuation of the starting element is only corrected, i.e. the starting element closed more firmly, if movement of the motor vehicle contrary to the predetermined travel direction is recognized. On the other hand, if the vehicle is moving in the predetermined travel direction, i.e. if it is crawling forward, then no further action is taken. Accordingly, if the vehicle's driver wants to prevent the forward crawling he would have to re-actuate the brake.

In the context of the present invention, any movement of the motor vehicle is preferably detected by observing rotational speeds in the drive-train, this being done particularly preferably by determining rotational speeds at a transmission input of a motor vehicle transmission. Monitoring rotational speeds at the transmission input has the advantage that there, due to the transmission ratio engaged at the time in the motor vehicle transmission, measurable rotational speeds are already present even with minimal vehicle movements. However, since measurement of a rotational speed close to zero is difficult and in addition the starting element cannot deliver arbitrarily small torques, the regulation is particularly preferably carried out with hysteresis. Consequently, a correction during holding operation is no longer carried out if the rotational speed, and therefore also the movement of the vehicle, lie only within a certain range. In this way loss of comfort due to constant control can be avoided.

Essential for the present invention is also that holding operation is only implemented when the brake release command has already been received but there is not yet a drive command from the vehicle's driver, who therefore does not yet want to move the motor vehicle in the predetermined travel direction. That is because only once the brake has been released can rotational speed changes resulting from an imbalance between a torque required for holding the motor vehicle and a torque in the drive-train be observed, so that it can be concluded therefrom that the motor vehicle is moving. Any rotational speeds before the brake has been released could well not be related to actual movement of the vehicle and would result in erroneous corrections of the starting element's actuation. If a drive command is received from the vehicle's driver after the brake has been released, then the holding operation must also be terminated, since it is clear that the vehicle's driver would like to take over control of the vehicle.

In the context of the invention "starting" of the motor vehicle means a movement of the motor vehicle desired by the driver, from rest, in the travel direction predetermined at the time. However, this also includes so-termed maneuvering processes in which the direction is changed between forward and reverse. In that case the holding operation serves to hold the vehicle in a position at rest during the maneuvering.

In an embodiment of the invention, holding operation is only activated in a gradient-dependent manner. Thus, holding is only activated when it is recognized that the motor vehicle is on an upward incline, since on level ground or even on a downward slope the holding operation would result in a correction of the starting element's actuation which would reinforce that movement of the motor vehicle which is actually to be prevented. As a further development of the invention, activation is only carried out if a currently detected upward gradient exceeds a limit value. In this way a current position of the motor vehicle on level ground or on a downward slope can be excluded.

Alternatively to the above-mentioned embodiment, in one possible design of the invention, during a holding operation an offset is chosen in relation to the correction of the starting element's actuation. Thus, in this case the possibility of exerting an influence during a holding operation is limited in an gradient-dependent manner, in order to avoid negative repercussions. On level ground and on gentle upward slopes only small, or even no correction values are possible, which are then only increased appropriately at larger inclinations.

As a further development of the invention the holding operation is inactivated as soon as the vehicle driver's drive command is received. That is, as soon as the vehicle driver's intention to move the vehicle and take over its control is recognized, correction of the starting element is terminated and consequently movement of the vehicle is no longer opposed. Further preferred, is that when the brake release command is received a position of an accelerator pedal at the time is detected as a reference value and an offset chosen in relation to the starting element's actuation is set to zero, whereby when the drive command has been received the offset is reduced in accordance with a change of a current position of the accelerator pedal in relation to the reference value. In this case it is important that with an accelerator pedal position equal to zero, the offset disappears in order to avoid continued crawling, and that the offset is not set to zero too abruptly since that would affect comfort adversely.

In accordance with a further embodiment of the invention, release of the brake after the release command has been received is also regulated. Particularly preferably, in this case the brake pressure can be reduced in the sense of a specified continuous process, or at least the reduction characteristic can be predetermined. What this achieves is that during the holding operation, as the drive-train torque approaches the holding torque or when the latter is exceeded the brake pressure is decreased slowly, whereby the vehicle too will only start moving slowly and the holding operation can be regulated in a simpler and more comfortable manner. In contrast, if there is a clear wish by the driver of the vehicle to start, the brake pressure is reduced rapidly so as not to delay starting any further. Particularly preferably, the brake release process is controlled by the control unit that implements the holding operation, in particular the transmission control unit.

In another possible design of the invention, the holding operation is inactivated if after the release command, relaxation of an accelerator pedal position is detected. In this way movement of the vehicle contrary to the predetermined travel direction is made possible if the vehicle's driver expressly desires this. This situation is recognized from a marked relaxation of the accelerator pedal position after the release command has already been received.

The method according to the invention is implemented in the area of a motor vehicle drive-train. The system according to the invention can also be incorporated as a computer program product which, when run on a processor, for example a processor of the transmission control unit, instructs the processor by software means to carry out the associated process steps which form the object of the invention. In this connection a computer-readable medium is also part of the object of the invention, in which a computer program product as described above is stored and can be called up.

The invention is not limited to the indicated combination of characteristics specified in the principal claim or the dependent claims thereof. There are additional possibilities for combining individual features with one another, in so far as they emerge from the claims, the description of a preferred embodiment of the invention given below, or directly from the drawing. The references in the claims to the drawing by using indexes is not intended to restrict the protective scope of the claims.

BRIEF DESCRIPTION OF THE DRAWINGS

An advantageous design of the invention, which is explained below, is represented in the drawing. The sole FIGURE shows a sequence diagram of a method according to the invention for regulating a drive-train during the starting process of a motor vehicle. In this case, during the course of the method the actuation of an automated starting element is regulated, and for that, as the starting condition of the method it must be detected that the motor vehicle is at rest.

DETAILED DESCRIPTION OF THE PREFERRED EMBODIMENTS

At the beginning of the process, in a step S1 it is first ascertained by interrogation, as the starting condition, whether a brake of the motor vehicle has already been released, i.e. whether a release command from the vehicle's driver has been received. This is determined in particular by detecting the position of a brake pedal, such that for this the brake pedal should either no longer be actuated at all or only to a very small extent. If in step S1 a release of the brake is recognized, the process moves on to step S2, whereas in the opposite case the process springs back to before step S1 and a new interrogation begins.

In step S2 it is then checked whether the vehicle is currently on an uphill gradient, in that a currently determined road inclination $\alpha$ is set against a limit value $\alpha_{Grenz}$. If the current uphill road inclination is smaller than this limit value $\alpha_{Grenz}$, the process terminates at step S3. This is in particular the case if the vehicle is currently on level ground or even on a downhill gradient, or if only a very slight uphill gradient has been detected. On the other hand, if the limit value $\alpha_{Grenz}$ is exceeded in step S2, then the process moves on to a step S4 in which it is ascertained by interrogation whether the vehicle's driver has already given a drive command. For this, preferably the current accelerator pedal position is ascertained, and in the case of a maximum or firm enough actuation of the accelerator pedal, whereby a target torque larger than an estimated holding torque is produced in the drive-train, it is concluded that the drive command has been issued. In such a case the process again reverts to step S3 and the method according to the invention is terminated.

In contrast, if no drive command from the vehicle's driver is detected in step S4, in a following step S5 a holding operation is activated and a current accelerator pedal angle $F_{P0}$ at the time is stored. Furthermore, a correction offset Off of the actuation of the starting element is set to zero. After that, in a step S6 a travel direction predetermined by the vehicle's driver is ascertained, in that a gear engaged in a motor vehicle transmission of the drive-train is checked or the drive mode selected therein is determined. Then, in a step S7 it is checked whether the motor vehicle is moving away from its current position, in that the rotational speeds at a transmission input of the motor vehicle are monitored. If the vehicle is not moving, then no further action is taken and the process moves directly to a step S8 in which it is ascertained whether a drive command from the vehicle's driver now exists or the vehicle's driver deliberately wants to move the vehicle contrary to the predetermined travel direction. If not, the process springs back to before step S7.

On the other hand, if in step S7 it is recognized from the transmission input rotational speeds that the vehicle has left its current position, then in a subsequent step S9 it is checked whether a movement of the motor vehicle in the predetermined travel direction or contrary to the predetermined travel direction is taking place. In the first case, in a step S10 actuation of the starting element is corrected by changing the correction offset Off in the direction toward a lower closure level, i.e. the starting element is opened farther in order to transmit a smaller torque. In contrast, if it is recognized in step S9 that the motor vehicle is moving contrary to the predetermined travel direction, then in a step S11 the correction offset Off is modified in such manner that the actuation of the starting element is corrected in the direction of a firmer closing level so that a larger torque is transmitted. Both at the conclusion of step S10 and that of step S11 the process goes back to step S8 and it is ascertained whether the vehicle's driver wants deliberately to move the vehicle contrary to the predetermined travel direction.

If such a drive command is recognized in step S8, or it is concluded on the basis of a marked relaxation of the position of the accelerator pedal that the driver's wish to move the vehicle contrary to the travel direction should be allowed, then in step S8, instead of springing back to before step S7 a transfer to step S12 takes place, where the holding operation is inactivated and in accordance with the accelerator pedal change relative to the stored accelerator pedal angle $F_{P0}$ the correction offset Off is reduced. After that, in a step S13 it is ascertained whether the correction offset Off has already become zero or the starting process has already finished, and, whether the vehicle is now moving regularly. If this is not so at the time the process reverts to step S12, whereas if it is the case, the process ends.

By virtue of the method according to the invention for regulating a drive-train, the movement of a motor vehicle from a current position during the course of starting can be prevented as effectively as possible.

INDEXES $\alpha$ Road inclination
$\alpha_{Grenz}$ Limit value
$F_{P0}$ Stored accelerator pedal angle
Off Offset
S1 to S13 Individual steps

The invention claimed is:

1. A method for regulating a drive-train of a motor vehicle, in which actuation of either an automatic or an automated starting element is regulated while starting the motor vehicle, and during a predetermined travel direction, reception of a brake release command and reception of a drive command, as specified by a driver of the motor vehicle, are monitored, and, after the brake release command is received and until the drive command is received, the motor vehicle is held substantially in a current position by a vehicle holding operation, but if movement of the motor vehicle is detected contrary to the predetermined travel direction, actuation of the starting element is adjusted in a direction toward a firmer engagement level, the method comprising:
adjusting actuation of the starting element, in a direction toward a lesser engagement level, during the vehicle holding operation, if movement of the motor vehicle is detected in the predetermined travel direction.

2. The method according to claim 1, further comprising only activating the vehicle holding operation in a gradient-dependent manner.

3. The method according to claim 2, further comprising carrying out activation of the vehicle holding operation only if a currently determined upward road inclination ($\alpha$) exceeds a limit value ($\alpha_{Grenz}$).

4. The method according to claim 1, further comprising determining an offset (Off) selected in relation to the adjustment of actuation of the starting element during the vehicle holding operation in a gradient-dependent manner.

5. The method according to claim 1, further comprising deactivating the vehicle holding operation as soon as the drive command from the driver of the vehicle is received.

6. The method according to claim 5, further comprising, when the brake release command is received, determining an accelerator pedal position as a reference value and setting an offset (Off) selected in relation to the adjustment of actuation of the starting element to zero, and when the drive command is received, reducing the offset (Off) in accordance with a change of a current position of an accelerator pedal position relative to the reference value.

7. The method according to claim 1, further comprising regulating the release of the brake, in addition, after the release command is received.

8. The method according to claim 1, further comprising deactivating the vehicle holding operation if, after the release command, a relaxation of an accelerator pedal position is detected.

9. A motor vehicle drive-train comprising an automated starting element, which is actuatable for regulating a drive-train of a motor vehicle while starting the motor vehicle, and during a predetermined travel direction, configured to monitor reception of a brake release command and reception of a drive command as specified by a driver of the motor vehicle, and, after the brake release command is received and until the drive command is received, the motor vehicle is held substantially in a current position by a vehicle holding operation, and if movement of the motor vehicle is detected contrary to the predetermined travel direction, actuation of the starting element is adjusted in a direction toward a firmer engagement level, and actuation of the starting element is adjusted in a direction toward a lesser engagement level, during the vehicle holding operation, if movement of the motor vehicle is detected in the predetermined travel direction.

10. A computer program of a motor vehicle drive-train comprising an automated starting element, which is actuatable for regulating a drive-train of a motor vehicle while starting the motor vehicle, and during a predetermined travel direction, the computer program configured to implement:
monitoring reception of a brake release command and reception of a drive command as specified by a driver of the motor vehicle,
holding the motor vehicle substantially in a current position by a vehicle holding operation after the brake release command is received and until the drive command is received,
adjusting actuation of the starting element in a direction toward a firmer engagement level, if movement of the motor vehicle is detected contrary to the predetermined travel direction,
adjusting actuation of the starting element in a direction toward a lesser engagement level, during the vehicle holding operation, if movement of the motor vehicle is detected in the predetermined travel direction, and
implementing actuation of the starting element based on commands stored in a software module.

11. The computer program according to claim 10, wherein the computer program is stored on a data carrier.

* * * * *